Patented June 30, 1936

2,045,843

UNITED STATES PATENT OFFICE 2,045,843

MANUFACTURE OF OXYGENATED ORGANIC COMPOUNDS

Henry Dreyfus, London, England

No Drawing. Application November 23, 1932, Serial No. 644,081. In Great Britain November 30, 1931

6 Claims. (Cl. 260—54)

This invention relates to the manufacture of cyclic diethers.

According to the invention cyclic diethers are produced by causing compounds containing the carbonyl group such as aldehydes and ketones to react with glycols or other polyhydric alcohols in the presence of etherification catalysts. The invention is more particularly concerned with the production of cyclic diethers by causing aldehydes to react with glycols, for instance the production of ethylene methylene dioxide from formaldehyde and ethylene glycol.

As examples of etherification catalysts which are particularly suitable for employment may be mentioned acids, for instance sulphuric acid, phosphoric acid, hydrochloric acid and benzene sulphonic acid, salts and especially those having an acid reaction, for example zinc chloride and ferric chloride and acid salts (i. e. salts containing a higher proportion of the acid anhydride than the normal salts) and especially alkali metal acid salts, e. g. sodium or potassium acid sulphates, acid phosphates, pyrosulphates and pyrophosphates.

Aldehydes may be employed as such, whether pure or in the form of aqueous or other solutions, e. g. the 40% commercial solution in the case of formaldehyde, or in the form of polymers, e. g. paraformaldehyde, trioxymethylene, paraldehyde and it is to be understood that, throughout the specification and claims, the term aldehyde includes such polymerized forms as well as unpolymerized forms.

The reaction between aldehydes and glycols may be carried out at temperatures between 100 and 200° C. although higher temperatures may be employed if desired. The use of temperatures between 130 and 180° C. is particularly advantageous.

A continuous method of operation is preferably adopted. For instance an aldehyde and a glycol may be supplied continuously in the desired proportions to a reaction liquor comprising the glycol and an etherification catalyst and maintained at a suitable temperature. Preferably the temperature at which the reaction liquor is maintained is such that the cyclic diether formed may distil off as it is produced since by adopting this method of continuous removal of the product the concentration of the catalyst may be maintained without continuous addition of fresh catalyst. Usually, even with higher aldehydes and glycols, employment of the temperature ranges above indicated will enable this end to be attained under normal atmospheric pressure.

Preferably the aldehyde and glycol are supplied in admixture and the reaction liquor contains the aldehyde initially as well as the glycol.

The production of the diethers may, however, be carried out as a batch or discontinuous process. Thus a mixture comprising an aldehyde, a glycol and the catalyst may be maintained at the desired temperature until the reaction is complete or has proceeded to the desired stage. As an alternative, the aldehyde in vapour or other form may be supplied to a heated bath comprising the glycol and etherifying catalyst until all, or the desired proportion, of glycol has been reacted upon.

Whilst the invention is not limited as to the quantity of catalyst employed, preferably only small amounts are used. For example, in the methods of operation above indicated reaction liquors containing between 2 and 50% of catalyst may be employed and when strong acids such as sulphuric acid are employed the reaction liquors preferably contain less than 30% of catalyst, the employment of such bodies in concentrations of between 5 and 10% being especially advantageous.

Although the reaction involves equimolecular proportions of the constituents, thus, the reaction between aldehydes and glycols involves one molecule of aldehyde per molecule of glycol, the invention is not limited to processes in which mixtures of the bodies are employed in or supplied to the reaction zone in equimolecular proportions.

The reaction products may be treated in any convenient way to free them from any unchanged starting materials that may be present or to remove dioxane or other impurities liable to be present. For instance the products may be subjected to fractional distillation, if desired after treatment with sodium hydrogen sulphite or the like to remove aldehyde and/or with sodium carbonate to effect neutralization of any acid present and sodium chloride to separate water present. It is to be noted, however, that the products and partially purified products, especially when neutral in reaction or neutralized, are themselves, like the purified dioxide, very useful for a number of purposes, especially as solvents or swelling agents for cellulose acetate or other cellulose derivatives. For instance, the partially purified products which contain dioxane, especially when free from aldehydes and acidity, are very useful solvents or swelling agents for cellulose acetate and other cellulose derivatives. The production of such partially purified products forms an important feature of the invention.

Besides the production of ethylene methylene dioxide by the reaction of ethylene glycol with formaldehyde or its polymers the process of the present invention enables the production, if higher glycols are employed in place of ethylene glycol, of the corresponding cyclic formals or methylene diethers of the higher glycols. For instance, with 1,3-propylene glycol, 2-dimethyl 1,3-propylene glycol and 1,2-propylene glycol there may be obtained propylene-methylene dioxide

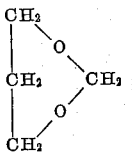

5,5-dimethyl-propylene-methylene dioxide

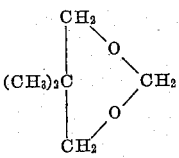

and 4-methyl ethylene-methylene dioxide

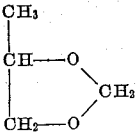

respectively.

Likewise if higher aldehydes (or polymers thereof are employed in place of formaldehyde (or polymers thereof) the corresponding glycol diethers of the higher aldehyde may readily be produced. For instance, with acetaldehyde (or polymers thereof such as paraldehyde or the like) the ethylidene diethers of glycols can readily be produced, e. g. 2-methyl ethylene methylene dioxide

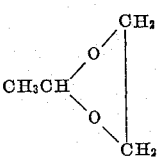

from ethylene glycol, 2,4-dimethyl ethylene methylene dioxide

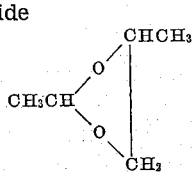

from 1,2-propylene glycol, 2-methyl-propylene methylene dioxide

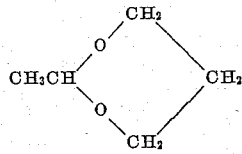

from 1,3-propylene glycol.

Obviously by the employment of mixtures of different aldehydes and/or different glycols mixtures of cyclic diethers may be produced.

The following example describes the production of ethylene methylene dioxide but it is to be understood that this example is given solely by way of illustration and is in no way limitative.

*Example*

A mixture of ethylene glycol and paraformaldehyde in molecular proportions (the molecular weight of paraformaldehyde being taken as 30) containing 6 parts of sulphuric acid per 100 parts of ethylene glycol is heated at about 140° C. in a reaction vessel provided with an inlet for fresh glycol and paraformaldehyde and a condenser connected to a receiver.

A mixture of glycol and paraformaldehyde in molecular proportions is supplied to the reaction vessel at the same rate as that at which the distillate collects.

The distillate is treated with sodium hydrogen sulphite to remove free aldehyde, sodium chloride is added to separate the water present as a lower layer and the upper layer, after being shaken with a small quantity of anhydrous sodium carbonate to remove acidity, is dried with calcium chloride and re-distilled.

A yield of ethylene methylene ether corresponding to about 80% of the theoretical yield is obtained.

The phrase "a compound containing the carbonyl group" as used in the description and claims is to be understood to mean an aldehyde or a ketone.

What I claim and desire to secure by Letters Patent is:—

1. A method of manufacturing distillable cyclic diethers, comprising subjecting to a condensation reaction at least one body selected from the group consisting of aldehydes and ketones with at least one polyhydric alcohol, said condensation reaction being carried out in the presence of a pyrosalt selected from the group which consists of pyrosulphates and pyrophosphates.

2. A method of manufacturing distillable cyclic diethers, comprising subjecting to a condensation reaction at least one aldehyde with at least one glycol, said condensation reaction being carried out in the presence of a pyrosalt selected from the group consisting of sodium and potassium pyrosulphates and pyrophosphates.

3. A method of manufacturing ethylene methylene dioxide, comprising subjecting to a condensation reaction an aldehyde of the empirical formula $(CH_2O)$ with ethylene glycol, said condensation reaction being carried out in presence of a pyrosalt selected from the group consisting of sodium and potassium pyrosulphates and pyrophosphates.

4. A method of manufacturing distillable cyclic diethers, comprising subjecting to a condensation reaction at least one body selected from the group consisting of aldehydes and ketones with at least one polyhydric alcohol, said condensation reaction being carried out in the presence of a pyrosalt selected from the group which consists of pyrosulphates and pyrophosphates, distilling the cyclic diethers from the reaction zone continuously with their production and maintaining the progress of the reaction by replenishing the reactants used.

5. A method of manufacturing distillable cyclic diethers, comprising subjecting to a condensation reaction at least one aldehyde with at least one glycol, said condensation reaction being carried out in the presence of a pyrosalt selected from the group consisting of sodium and potassium pyrosulphates and pyrophosphates, distilling the cyclic diethers from the reaction zone continuously with their production and maintaining the progress of the reaction by replenishing the reactants used.

6. A method of manufacturing ethylene methylene dioxide, comprising subjecting to a condensation reaction an aldehyde of the empirical formula (CH₂O) with ethylene glycol, said condensation reaction being carried out in presence of a pyrosalt selected from the group consisting of sodium and potassium pyrosulphates and pyrophosphates, distilling the ethylene methylene dioxide from the reaction zone continuously with its production and maintaining the progress of the reaction by replenishing the reactants used.

HENRY DREYFUS.